Nov. 10, 1925.
J. H. SAGER
1,560,944
MUD GUARD FENDER FOR MOTOR VEHICLES
Filed Oct. 7, 1924
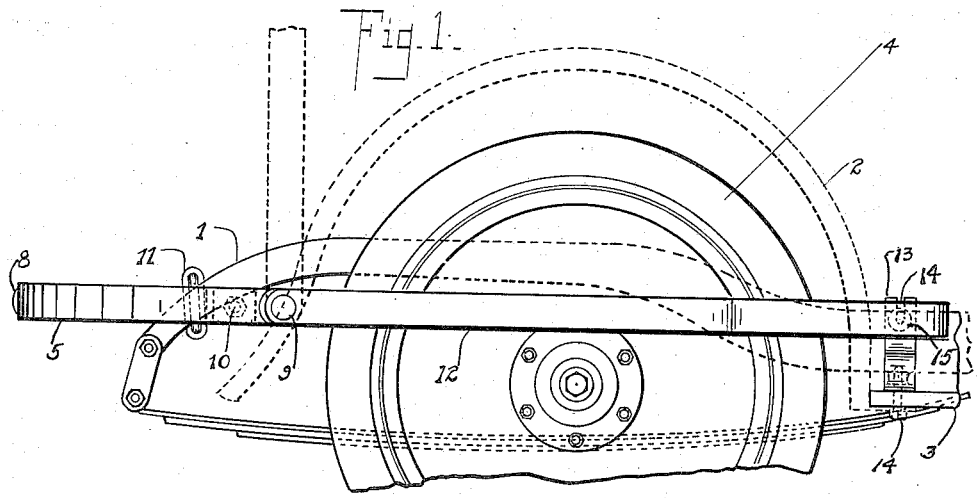
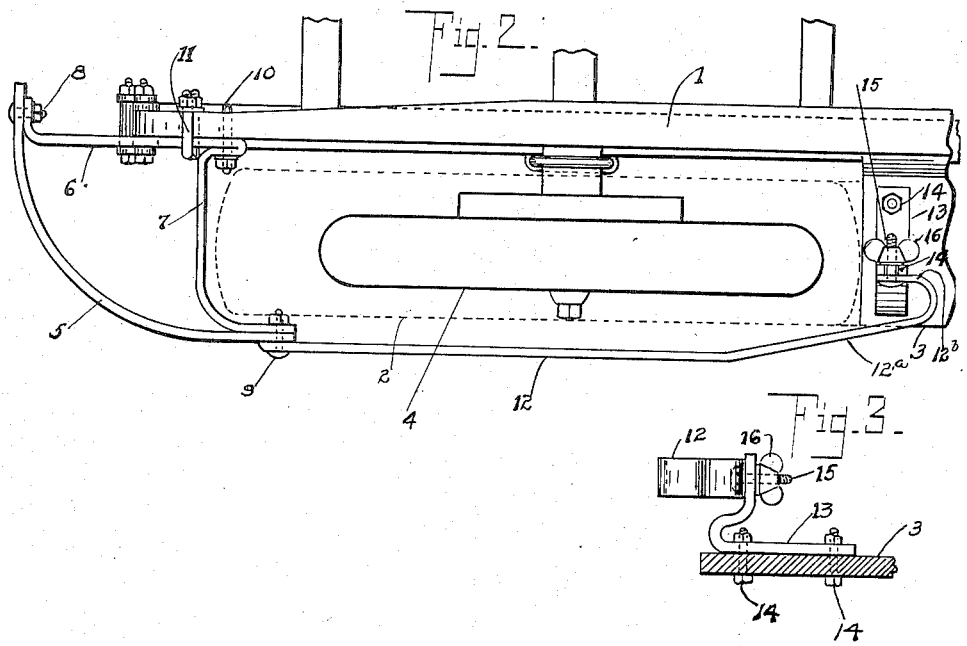
INVENTOR.
James H. Sager
BY
his ATTORNEYS.

Patented Nov. 10, 1925.

1,560,944

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

MUD-GUARD FENDER FOR MOTOR VEHICLES.

Application filed October 7, 1924. Serial No. 742,240.

*To all whom it may concern:*

Be it known that I, JAMES H. SAGER, a citizen of the United States, and resident of Rochester, in the county of Monroe and State of New York, have invented certain new and useful Improvements in Mud-Guard Fenders for Motor Vehicles, of which the following is a specification.

The present invention relates to mud guard fenders for motor vehicles and an object of the invention is to provide a construction which will protect the mud guard of a motor vehicle against impact from other mud guards in any direction and will more particularly prevent the mud guard being engaged on the underside by the mud-guard of another vehicle. Another object of the invention is to provide a construction in which an impact member will extend along the side of the mud guard in a position where the mud guard of another vehicle cannot pass beneath the mud guard equipped with this invention, provision being made whereby the fender may be moved to permit the removal of the wheel about which the mud guard extends. Still another object of the invention is to provide a fender extending along a mud guard and supported at its forward end upon the running board or step of the vehicle and at its rear by the frame of the machine.

To these and other ends, the invention consists of certain parts and combinations of parts, all of which will be hereinafter described: the novel features being pointed out in the appended claims.

In the drawings:

Fig. 1 is a fragmentary view of an automobile showing the position of the fender with reference to the mud guard;

Fig. 2 is a plan view of the fender; and

Fig. 3 is a section through the running board or step showing the forward end of the fender.

Referring more particularly to the illustrated embodiment of the invention, 1 indicates the longitudinally extending bar or beam of the main frame of the machine, 2 the mud guard, 3 the running board or step connected to the forward end of the mud guard, and 4 the wheel about which the mud guard 2 extends.

The fender for the protection of the mud guard 2, in this instance, embodies two elements. One of these elements is in the form of an impact member 5 lying in the plane of the mud guard 2 and supported by a supporting bracket embodying two arms 6 and 7 formed, in this instance, from one piece of material bent between its ends. Arm 6 of said supporting bracket lies generally parallel with the side beam 1 and the other, in this instance, extends substantially at right angles to the arm 6. Bolts 8 and 9 connect respectively the arm 6 and the arm 7 with the impact member 5. Adjacent the bend connecting the two arms 6 and 7 the metal lies in overlapping relation and through these overlapping portions, a J bolt 10 is passed, said bolt being secured to the lower flange of the side bar 1. A U shaped clip 11 passes around the arm 6 and also about the side bar 1 which still further secures this portion of the fender to the side bar. It is apparent that the impact member 5 will guard the mud guard 2 against another vehicle engaging the outer surface of the mud guard.

The other element of the fender embodies an impact member 12 in the form of an elongated bar extending across the outer edge of the mud guard and the outer face of the wheel. This impact member 12 is pivotally supported on the bolt 9 which secures the arm 7 to one end of the impact member 5 so that the impact member 12 practically forms a continuation of one end of the impact member 5. The other end of the impact member 12 is detachably connected to the running board 3 and to this end the running board has a bracket 13 secured thereto by bolts 14 extending upwardly from the running board, its upper end being provided with a slot or groove 14 in which a bolt 15 with a winged nut 16 thereon is adapted to be secured, this bolt being attached to the end of the impact member. To the end that the forward end of the impact member will not project so as to contact with objects, the forward portion of the impact member is deflected inwardly at 12$^a$ so that it extends in a vertical plane beyond the outer edge of the running board 3 and its extreme end is bent rearwardly at 12$^b$ to connect with the bracket 13, thereby permitting the bracket to lie close to the forward end of the mud guard 2, and, at the same time, protecting the bracket against blows as well as the upper face of the forward end of the mud guard.

From the foregoing it will be seen that there has been provided a fender for the protection of a mud guard of a motor vehicle. This fender has a portion or part extending across the outer edge of the mud guard and across the outer face of the wheel about which the mud guard passes, the fender lying preferably above the axis of turning of the wheel, so that parts of other cars or vehicles cannot pass under the downwardly curved ends of the mud guard. The impact member which extends across the outer face of the wheel is movable to a position where the wheel can be readily removed from the axle. In the illustrated embodiment of the invention, a part of the fender is fixed and extends across the upper face and one end of the mud guard so as to protect the mud guard from blows in connection with the plane of the mud guard.

What I claim as my invention and desire to secure by Letters Patent is:

1. The combination with a vehicle frame, a wheel supporting said frame, a mud guard associated with said wheel, and a step secured at one end to the mud guard, of a bracket secured to said step, and a fender for the mud guard secured to said bracket having a portion extending to one side of the bracket to protect the latter against blows, said fender also extending across the outer edge of the mud guard and the outer face of the wheel and being secured to the frame at the opposite end of the mud guard.

2. A fender for mud guards for motor vehicles comprising two impact members, one of which lies in the plane of the mud guard and the other of which is pivoted to one end of said first mentioned member and lies across the outer edge of the mud guard, its forward end having a deflecting portion and being curved inwardly and rearwardly, a bracket detachably securing the rearwardly extending portion of said pivotally mounted member and protected by said curved portion, and supporting arms for the first mentioned impact member, one extending in the direction generally parallel with the longitudinal axis of the vehicle and the other extending outwardly with reference to the first mentioned arm.

JAMES H. SAGER.